No. 727,083. PATENTED MAY 5, 1903.
E. W. BURGESS.
CHAIN TIGHTENER.
APPLICATION FILED JUNE 9, 1902.

NO MODEL.

Witnesses
Chas. R. Straughn
E. J. Birkett

Inventor
Edward W. Burgess

No. 727,083. Patented May 5, 1903.

UNITED STATES PATENT OFFICE.

EDWARD W. BURGESS, OF MILWAUKEE, WISCONSIN, ASSIGNOR TO INTERNATIONAL HARVESTER COMPANY, OF CHICAGO, ILLINOIS, A CORPORATION OF NEW JERSEY.

CHAIN-TIGHTENER.

SPECIFICATION forming part of Letters Patent No. 727,083, dated May 5, 1903.

Application filed June 9, 1902. Serial No. 110,770. (No model.)

*To all whom it may concern:*

Be it known that I, EDWARD W. BURGESS, a citizen of the United States, residing at Milwaukee, in the county of Milwaukee and State of Wisconsin, have invented certain new and useful Improvements in Chain-Tighteners, of which the following is a specification, reference being had to the accompanying drawings, forming a part thereof.

My invention relates to improvements in chain-tighteners in which one or more of the chain-wheels are movable bodily with their shafts or journals in a direction to tighten the chain; and the objects of my improvement are, first, to provide a guideway to guide the journal in a proper direction; second, to provide a positive means for forcing the journal along the guideway. I attain these objects by the mechanism illustrated in the accompanying drawings, in which—

Figure 1:
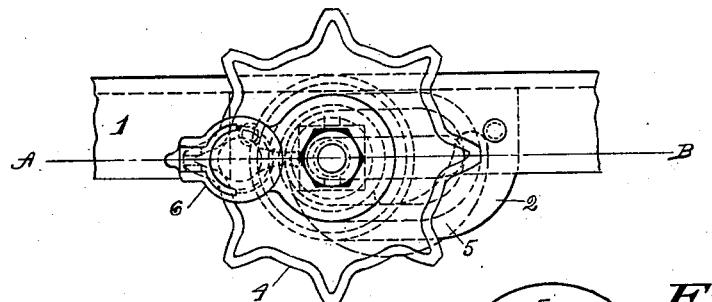
Figure 3:
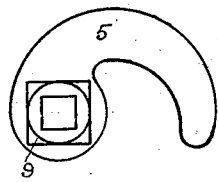
Figure 2:
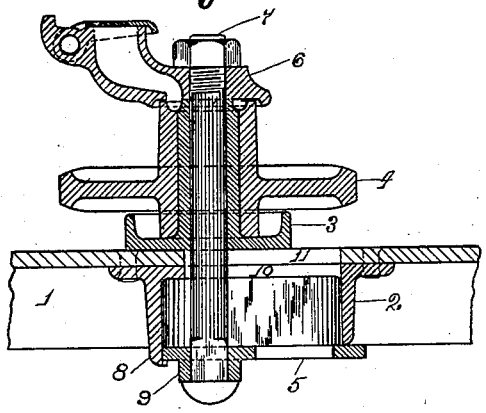

Figure 1 is a plan view; Fig. 2, a vertical section on the line A B, Fig. 1; and Fig. 3 is a detached view of the scroll-lever.

Similar numerals refer to similar parts throughout the several views.

1 is an L-shaped rail supporting the various parts of the mechanism and forming a part of the frame of the machine of which the chain-tightener forms a part.

2 is a slotted bracket or plate secured to the part 1.

3 is a stud-journal, on which is mounted the sprocket-wheel 4.

5 is a scroll or cam-shaped lever resting upon the plate 2.

6 is a washer seated on the outer end of the stud 3, and 7 is a bolt that clamps the various parts together.

On the plate 2 is formed a lug 8, which engages with the cam-shaped outer edge of the lever 5, as shown in Fig. 2. On the lever 5 is formed the angular hub 9, and the plate 2 is provided with the slot 10, coinciding with the slot 11 in the part 1. It may be seen that as Fig. 2 is a vertical section on line A B of Fig. 1 the plate 2 on this line is below the horizontal web of the L-shaped frame-piece. It is designed to have that portion of the upper surface of the plate that is outside of the frame-piece in line with the upper surface of said frame-piece, so that the broad base of the stud will rest upon each.

In operating the device the operator loosens the nut on the bolt 7. Then by placing a wrench on the angular boss 9 the lever 5 is turned in the direction required, and the back of the lever engages with the projection 8 on the plate 2 and moves the bolt 7, stud 3, and wheel 4 along the plate 2 until the required tightness is obtained, when the nut is tightened on the bolt 7 and the various parts thereby secured in position.

What I claim as my invention, and desire to secure by Letters Patent, is—

1. In a chain-tightener, the combination of a frame-piece, there being a slot in said frame-piece, a plate having a slot coinciding with the slot in said frame-piece, there being an abutting lug on the plate, a stud-journal supported by the frame-piece, a chain-wheel journaled on the stud, a cam-shaped lever, having a portion of its periphery resting against the abutting lug, and a bolt that passes through the lever, the plate and stud-journal, whereby they are secured in operative position.

2. In a chain-tightener, the combination of, a frame-piece, there being a slot in said piece, a plate having a slot coinciding with the slot in said frame-piece, there being an abutting lug on the plate, a stud-journal supported by the frame-piece, a chain-wheel journaled on the stud, a cam-shaped lever having a portion of its periphery resting against said abutting lug, there being an angular projection on the lever, and a bolt that passes through the lever, the plate, and the stud-journal, whereby they are secured in operative position.

In witness whereof I hereto affix my signature in presence of two witnesses.

EDWARD W. BURGESS.

Witnesses:
 FRANK J. DRYBURGH,
 EARLE J. BRYDEN.